United States Patent
Ikegami

[19]

[11] Patent Number: 6,076,421
[45] Date of Patent: Jun. 20, 2000

[54] SHIFT-LEVER DEVICES WITH SUPPORT FOR PLATE SPRING

[75] Inventor: Yasuyuki Ikegami, Shizuoka, Japan

[73] Assignee: Fuji Kiko Co., Ltd., Tokyo, Japan

[21] Appl. No.: 09/046,537

[22] Filed: Mar. 24, 1998

[30] Foreign Application Priority Data

Mar. 26, 1997 [JP] Japan ................................. 9-072552

[51] Int. Cl.[7] ........................... B60K 20/02; G05G 5/06
[52] U.S. Cl. .......................... 74/473.28; 74/527; 267/41
[58] Field of Search ................... 74/473.28, 527; 267/41, 47, 52

[56] References Cited

U.S. PATENT DOCUMENTS

| | | | |
|---|---|---|---|
| 5,277,078 | 1/1994 | Osborn et al. | 74/527 X |
| 5,445,046 | 8/1995 | Kataumi et al. | 74/527 X |
| 5,478,104 | 12/1995 | Worrel et al. | 267/41 X |
| 5,598,740 | 2/1997 | Itoh | 74/527 |
| 5,775,165 | 7/1998 | Lu | 74/473.28 |

FOREIGN PATENT DOCUMENTS

| | | |
|---|---|---|
| 0 757 192 | 2/1997 | European Pat. Off. . |
| 0 759 517 | 2/1997 | European Pat. Off. . |
| 6-50942 | 7/1994 | Japan . |
| 8-159252 | 6/1996 | Japan . |

*Primary Examiner*—David M. Fenstermacher
*Attorney, Agent, or Firm*—Foley & Lardner

[57] ABSTRACT

A shift-lever device includes a shift lever rotatably supported to a casing, a restraining lever rotated with the shift lever and formed with a groove, a plate spring having one end pressed on the groove of the restraining lever and a middle portion between one and another ends, a spring support arranged with a side wall of the casing for supporting another end of the plate spring, and a middle support arranged with the side wall of the casing for contacting the upper side of a middle portion of the plate spring.

11 Claims, 5 Drawing Sheets

SHIFT-LEVER DEVICES WITH SUPPORT FOR PLATE SPRING

BACKGROUND OF THE INVENTION

The present invention relates to shift-lever devices for use in automatic transmissions for motor vehicles, and particularly, to supports for plate springs for giving restrained feel upon shift operation.

The shift-lever device is a device that ensures shifting to a desired position through a shift lever moved lengthwise with respect to a vehicular body. Upon shift operation, the shift-lever device gives a restrained feel.

Specifically, the shift lever is rotatably supported through a shank to a casing fixed to the vehicular body. A plate spring has one end connected through a bracket to the shift lever by a bolt/nut, etc., and another end pressed on a wavy surface of a groove of a restraining block arranged with a side wall of the casing. When operating the shift lever, another end of the plate spring is moved over the wavy surface of the groove. A resistance produced at that time forms a source of restrained feel.

With the known shift-lever device, however, the plate spring is connected to the shift lever by a bolt/nut, etc., increasing the number of parts and assembling work, resulting in lowered assembling efficiency and increased manufacturing cost. Moreover, due to the fact that the restraining block is fixed to the casing, and the plate spring is moved with elastic deformation together with the shift lever, the plate spring, which works frequently during vehicular cruising, may have reduced strength and durability, having a problem of possible breakdown.

It is, therefore, an object of the present invention to provide shift-lever devices that allow an improvement of the assembling efficiency, and a reduction in manufacturing cost.

SUMMARY OF THE INVENTION

One aspect of the present invention lies in providing a shift-lever device for an automatic transmission, comprising:

a casing with a side wall;
a shift lever rotatably supported to said casing;
a restraining lever rotated with said shift lever, said restraining lever being formed with a groove;
a plate spring having one end pressed on said groove of said restraining lever and another end, said plate spring having a middle portion between said one and another ends;
a first support arranged with said side wall of said casing, said first support supporting said another end of said plate spring; and
a second support arranged with said side wall of said casing, said second support contacting an upper side of said middle portion of said plate spring.

Another aspect of the present invention lies in providing a shift-lever device for an automatic transmission, comprising:

a casing with a side wall;
a shift lever rotatably supported to said casing;
a restraining lever rotated with said shift lever, said restraining lever being formed with a groove;
a plate spring having one end pressed on said groove of said restraining lever and another end, said plate spring having a middle portion between said one and another ends;
first means, arranged with said side wall of said casing, for supporting said another end of said plate spring; and
second means, arranged with said side wall of said casing, for contacting an upper side of said middle portion of said plate spring.

DETAILED DESCRIPTION OF THE INVENTION

Figure 1:
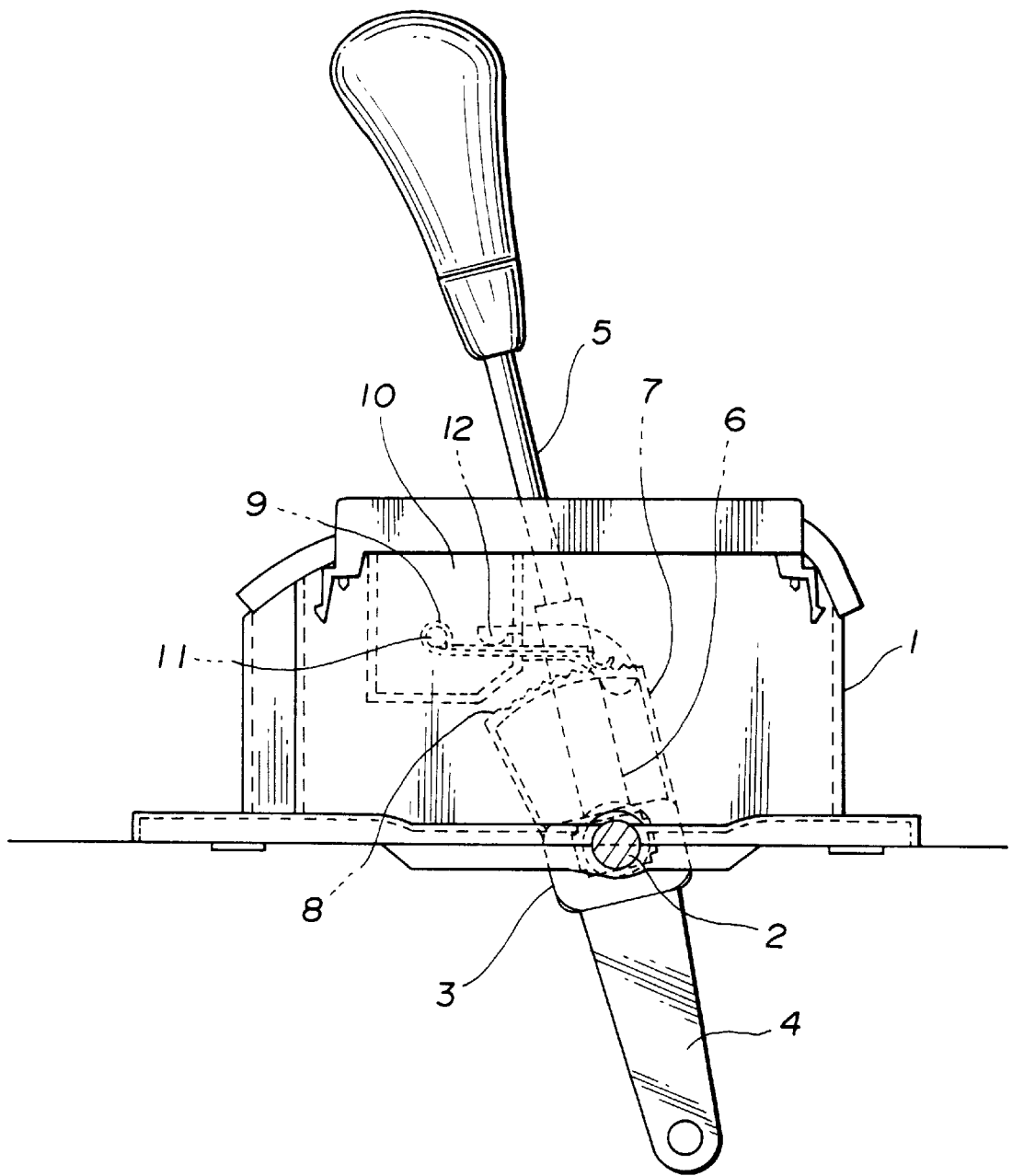
FIG. 1 is a front view showing a first embodiment of a shift-lever device according to the present invention.

Referring to the drawings wherein like reference numerals designate like parts throughout the views, a shift-lever device embodying the present invention will be described.

Figure 2:
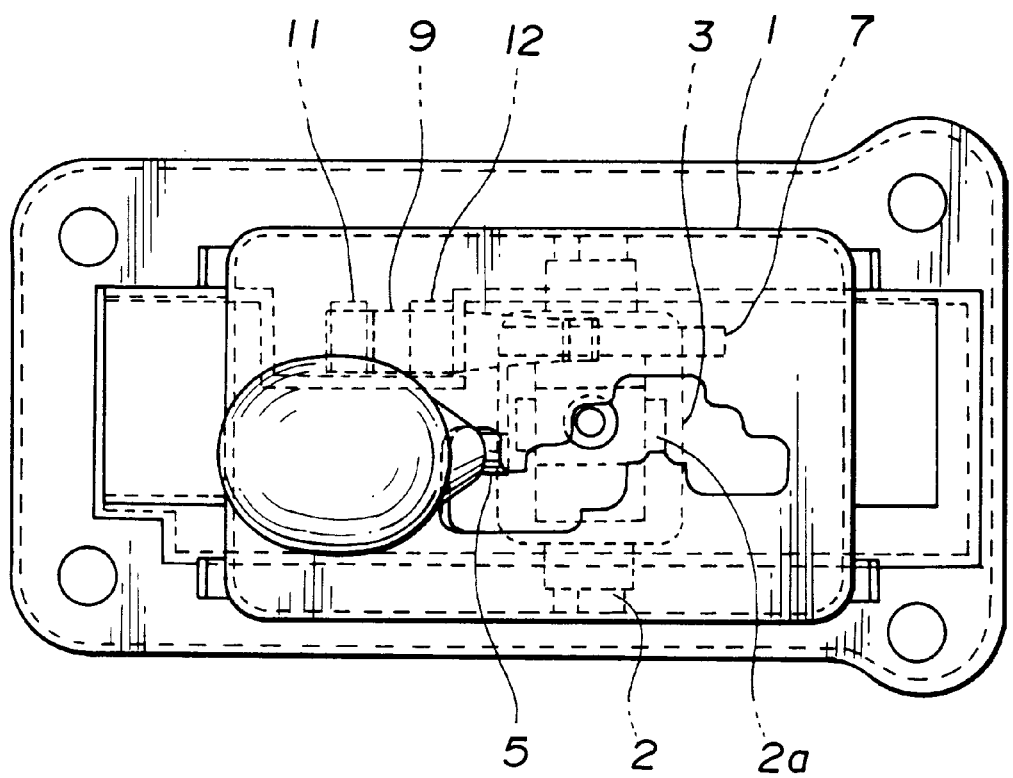
FIG. 2 is a plan view showing the shift-lever device.
Figure 3:
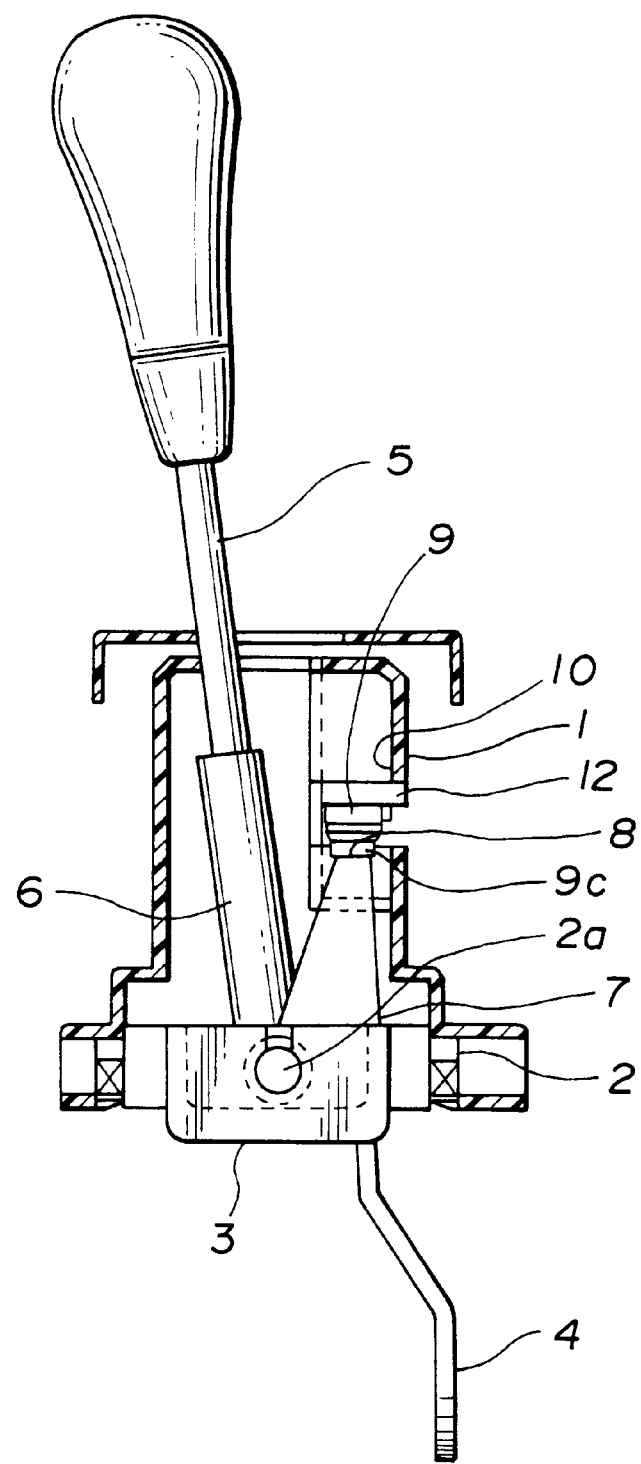
FIG. 3 is a cross section showing the shift-lever device.

FIGS. 1–4 show a first embodiment of the present invention. Referring to FIGS. 1–3, a shift-lever device comprises a casing 1 of a synthetic resin fixed to a vehicular body, and a shift base 3 supported to the casing 1 through a shaft 2 to be rotatable lengthwise with respect to the vehicular body. Built in the shift base 3 made of a synthetic resin is a metallic shift lever 4 connected to a cable that extends to an automatic transmission, whereas supported thereto through a shaft 2a is a shift-lever support 6 for supporting the shift lever 5 to be rotatable crosswise with respect to the vehicular body. Moreover, formed with the shift base 3 is a substantially sectorial restraining lever 7 having a circular arc with center at the shaft 2 and a predetermined radius. The restraining lever 7 has an upper end face formed with a groove 8 with a wavy surface.

Figure 4:
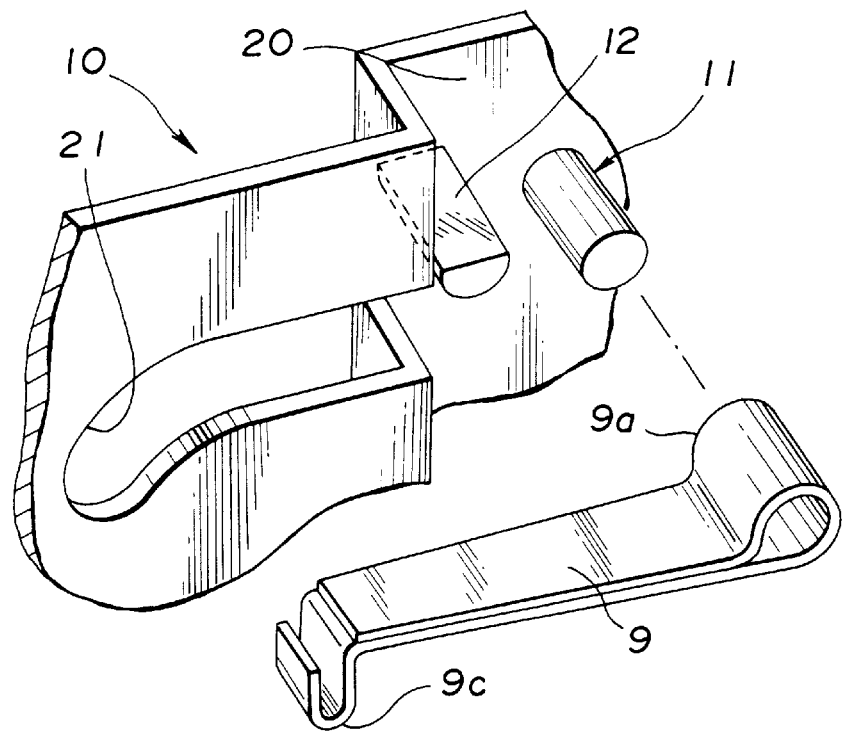
FIG. 4 is a fragmentary perspective view showing the shift-lever device.

A plate spring 9 has one end pressed on the groove 8 of the restraining lever 7, and another end supported to a spring support or first support 11 arranged with a side wall 10 of the casing 1. As shown in FIGS. 3–4, one end of the plate spring 9 has a substantially U-shaped bend 9c engaged with the groove 8 of the restraining lever 7. Referring particularly to FIGS. 1 and 4, a middle support or second support 12 is protrusively arranged with the side wall 10 of the casing 1 to contact the upper side of a middle portion of the plate spring 9 between one and another ends thereof. The spring support 11 and the middle support 12 are arranged in a concavity 20 obtained by denting inward a part of the side wall 10 of the casing 1. A recess 21 is formed to extend from the vicinity of the middle support 12 of the concavity 20 to the side wall 10. The recess 21 is curvedly shaped so that the plate spring 9 can be assembled to the spring support 11 by its simple engagement therewith from the outside of the side wall 10. The middle support 12 is semicylindrically shaped and is disposed to have a circular surface contacting the plate spring 9.

Referring to FIG. 4, the structure of the shift-lever device will be described more detailedly. The spring support 11 and the middle support 12 are extending from the side wall 10.

The spring support 11 is shaped like a cylinder with a predetermined length, whereas the middle support 12 is shaped like a semicylinder with a predetermined length and a circular surface down. As described above, the recess 21 is formed to extend from the vicinity of the middle support 12 of the concavity 20 to the side wall 10. The recess 21 is curvedly shaped in accordance with the plate spring 9 to allow insertion thereof. Another end of the plate spring 9 has an annulus 9a engaged with the spring support 11.

Such a structure enables easy assembling of the plate spring 9. That is, upon assembling, one end of the plate spring 9 is inserted into the recess 21 from the outside of the side wall 10 to engage the annulus 9a of the plate spring 9 with the spring support 11, then, it is pressed on the groove 8 of the restraining lever 7 with the upper side of the middle portion of the plate spring 9 abuttingly engaged with the middle support 12. It is thus understood that the plate spring 9 can be assembled to the spring support 11 by its simple engagement therewith from the outside of the side wall 10.

Figure 5:
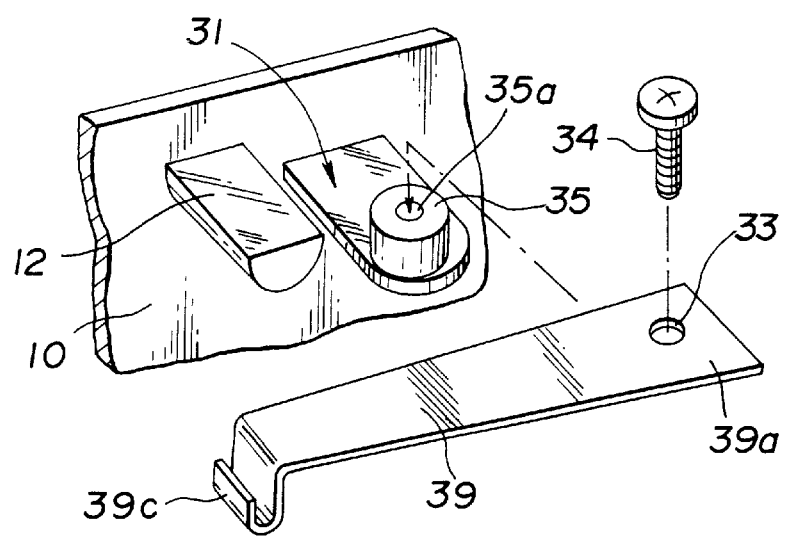
FIG. 5 is a view similar to FIG. 4, showing a second embodiment of the present invention.

FIG. 5 shows a second embodiment of the present invention, which is substantially the same as the first embodiment except that a spring support 31 includes a plate with a protrusion 35 arranged on the upper side and having a flat portion with a screw hole 35a. Another end 39a of a plate spring 39 is shaped like a plate and is mounted on the flat portion of the protrusion 35 by a screw 34 engaged with the screw hole 35a of the protrusion 35 and a through hole 33 of another end 39a of the plate spring 39.

Figure 6:
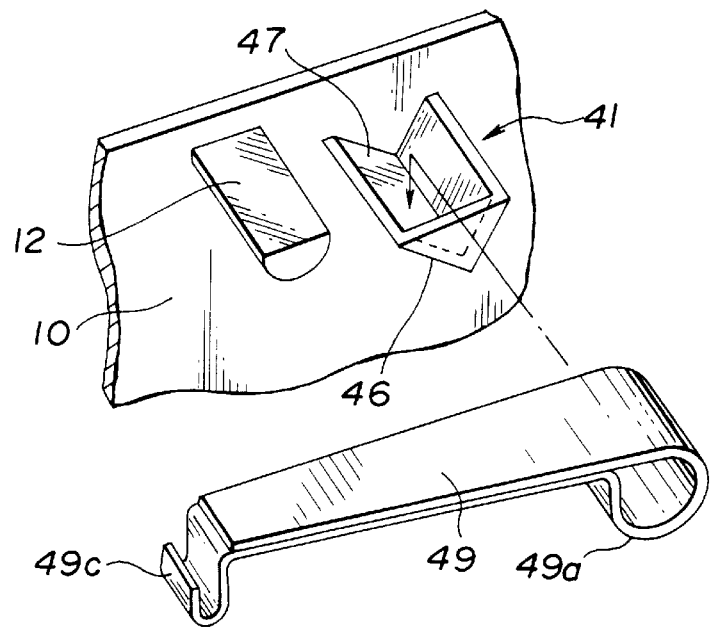
FIG. 6 is a view similar to FIG. 5, showing a third embodiment of the present invention.

FIG. 6 shows a third embodiment of the present invention which is substantially the same as the above embodiments except that a spring support 41 includes a substantially triangular prism 46 having a substantially triangular bottom 47 on which another end of a plate spring 49 is disposed. Another end of the plate spring 49 has an annulus 49a formed in the direction opposite to the annulus 9a of the plate spring 9 as shown in FIG. 4. According to the third embodiment, in the normally assembled state of the shift-lever device, the plate spring 49 has one end pressed on the groove 8 of the restraining lever 7, another end or the annulus 49a engaged with the triangular bottom 47 of the spring support 41, and a substantially middle portion pressed downward by the middle support 12.

Figure 7:
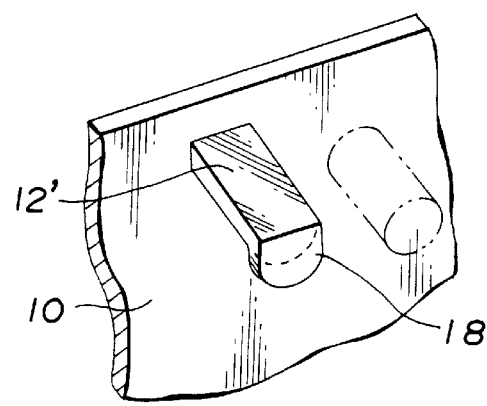
FIG. 7 is a view similar to FIG. 6, showing a variant of a middle support.
Figure 8:
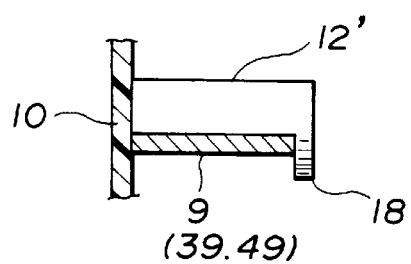
FIG. 8 is a sectional view showing the middle support.

FIG. 7 shows a variant of the middle support 12. A middle support 12' has an end formed with an anti-disengagement member 18, which extends downward like a hook to cooperate with the side wall 10 to hold the plate spring 9 (39, 49) as shown in FIG. 8, preventing movement of the plate spring 9 in the cross direction of the shift-lever device. Note that the shift-lever device as shown in FIG. 6 has two anti-disengagement members for the plate spring 49, i.e., the anti-disengagement member 18 of the middle support 12' and an anti-disengagement member obtained by closing an end of the triangular prism 46.

With the structure as shown in FIGS. 4 and 6, the plate spring can be assembled by only engaging another end of the plate spring with the spring support and without using a screw, resulting in excellent assembling efficiency. On the other hand, with the structure as shown in FIG. 5, the protrusion 35 with which the screw 34 is engaged needs no use of a strong member and thus can be formed with the casing 1 of a synthetic resin, resulting in a reduction in the number of parts and manufacturing cost.

Having described the present invention in connection with the preferred embodiments, it is noted that the present invention is not limited thereto, and various changes and modifications can be made without departing from the scope of the present invention.

By way of example, in the embodiments, the shift-lever device is of the gate type so called wherein the shift lever can be rotated lengthwise or crosswise with respect to the vehicular body. Alternatively, the shift-lever device may be of the straight type wherein the shift lever can be rotated only lengthwise. In that case, the shift base and the shift-lever support are integrated with each other.

Moreover, in the embodiments, the spring support and the middle support are arranged in the concavity of the side wall of the casing, alternatively, they may be arranged inside the side wall, which needs, however, assembling in the casing, resulting in lowered assembling efficiency.

What is claimed is:

1. A shift-lever device for an automatic transmission, comprising:
   a casing with a side wall;
   a shift lever rotatably supported to said casing;
   a restraining lever which rotates with said shift lever, said restraining lever being formed with a groove;
   a plate spring having one end pressed on said groove of said restraining lever and another end, said plate spring having a middle portion between said one and another ends;
   a first support extending from said side wall of said casing, said first support supporting said another end of said plate spring; and
   a second support extending from said side wall of said casing, said second support contacting an upper side of said middle portion of said plate spring.

2. A shift-lever device as claimed in claim 1, wherein said casing side wall is formed with a concavity in which said first and second supports are arranged.

3. A shift-lever device as claimed in claim 1, wherein said first support includes a plate with a protrusion arranged on an upper side of said plate, said protrusion having a flat portion; and said another end of said plate spring includes a flat surface mounted to said flat portion of said protrusion of said first support.

4. A shift-lever device as claimed in claim 1, wherein said first support includes a substantially triangular prism having a substantially triangular bottom, and said another end of said plate spring includes an annulus disposed on said triangular bottom of said triangular prism of said first support.

5. A shift-lever device as claimed in claim 1, wherein said second support includes a semi-cylindrical members with a circular surface contacting said upper side of said middle portion of said plate spring.

6. A shift-lever device as claimed in claim 1, wherein said second support includes an anti-disengagement member at an end thereof for preventing movement of said plate spring in a cross direction of the shift-lever device.

7. A shift-lever device as claimed in claim 1, wherein said first support includes a cylinder, and said another end of said plate spring includes an annulus rotatably engaged with said cylinder of said first support.

8. A shift-lever device as claimed in claim 7, wherein said first support is located inside said casing.

9. A shift-lever device as claimed in claim 1, wherein said casing side wall has a recess, and said one end of said plate spring is arranged through said recess.

10. A shift-lever device as claimed in claim 9, wherein said one end of said plate spring is located inside said casing.

11. A shift-lever device for an automatic transmission, comprising:
    a casing with a side wall;

a shift lever rotatably supported to said casing;

a restraining lever which rotates with said shift lever, said restraining lever being formed with a groove;

a plate spring having one end pressed on said groove of said restraining lever and another end, said plate spring having a middle portion between said one and another ends;

first means, extending from said side wall of said casing, for supporting said another end of said plate spring; and second means, extending from said side wall of said casing, for contacting an upper side of said middle portion of said plate spring.

* * * * *